Figure 1:
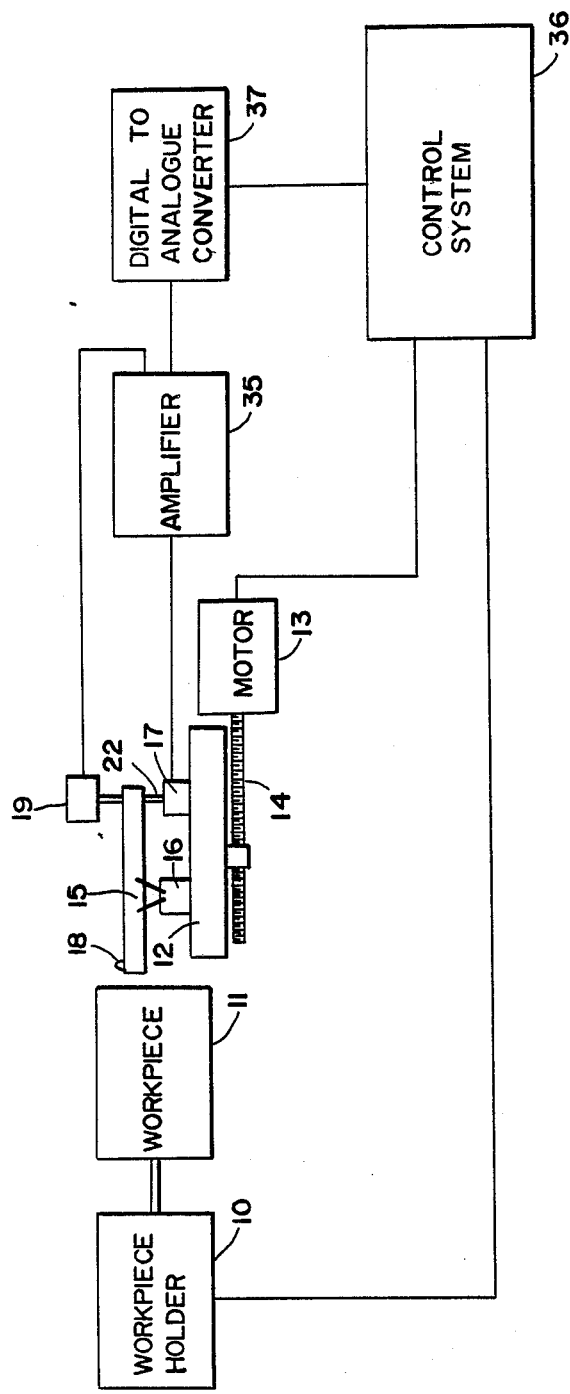

United States Patent [19]

New

[11] Patent Number: 4,936,173
[45] Date of Patent: Jun. 26, 1990

[54] MACHINE TOOLS

[75] Inventor: Nigel H. New, Harrow, England
[73] Assignee: AE PLC, Warwickshire, England
[21] Appl. No.: 26,485
[22] PCT Filed: Jul. 22, 1986
[86] PCT No.: PCT/GB86/00433
 § 371 Date: Mar. 16, 1987
 § 102(e) Date: Mar. 16, 1987
[87] PCT Pub. No.: WO87/00473
 PCT Pub. Date: Jan. 29, 1987

[30] Foreign Application Priority Data

Jul. 23, 1985 [GB] United Kingdom ............... 8518610

[51] Int. Cl.⁵ .................................. B23B 3/28
[52] U.S. Cl. ............................ 82/18; 51/166 TS; 51/354; 82/158
[58] Field of Search ............... 82/24 R, 36 R, 18, 19, 82/40; 51/2 Q, 2 S, 166 TS, 354

[56] References Cited

U.S. PATENT DOCUMENTS

| | | | |
|---|---|---|---|
| 1,759,196 | 5/1930 | Jackson | 51/2.5 |
| 2,525,216 | 10/1950 | Garrand | 82/36 R |
| 3,361,018 | 1/1968 | Druckman | . |
| 4,203,062 | 5/1980 | Bathen | . |
| 4,509,002 | 4/1985 | Hollis, Jr. | . |
| 4,646,595 | 3/1987 | Slee | 82/19 |

FOREIGN PATENT DOCUMENTS 0044200 1/1982 European Pat. Off. .
2046160 11/1980 United Kingdom .
2149144 6/1985 United Kingdom .

OTHER PUBLICATIONS

VDI "Getriebetechnik", VDI-Tagungsheft, Oct., 1953, Deutscher—Ingenieur—Verlag GmbH (Düsseldorf, DE).

Primary Examiner—Frederick R. Schmidt
Assistant Examiner—Robert Showalter
Attorney, Agent, or Firm—Leydig, Voit & Mayer

[57] ABSTRACT

A machine tool includes an elongate tool holder which is mounted by a pair of spring strips for pivotal movement on a mounting. One end of the tool holder carries the tool while the other end of the tool holder is moved by an actuator via a rod. Tool positioning signals are fed to the actuator in digital form and are converted to analogue form by a digital-to-analogue converter before being applied to the actuator. The tool holder is of light-weight and low inertia and can thus effect rapid changes of tool position, so exploiting to the full the high rates of positioning signal production of modern machine tool control systems.

6 Claims, 2 Drawing Sheets

MACHINE TOOLS

The invention relates to machine tools and in particular to the tool holders of such machine tools and their actuation.

In conventional machine tools, even machine tools of the numerical controlled (NC) and computer numerical controlled (CNC) type, the tool is mounted on a carriage which is moved by a motor driving the carriage through a lead screw. Tool control signals are supplied to the motor by a control system to cause the tool to machine a rotating workpiece to a required profile.

It is a disadvantage of such machine tools that the inertia of the tool carriage and the backlash in the lead screw limits the rate at which the tool can be moved. Thus such machine tools cannot rapidly machine workpieces to complex surface profiles.

According to a first aspect of the invention, there is provided a machine tool comprising a workpiece holder for holding and rotating a workpiece to be machined, an elongate tool holder having two ends and being mounted, intermediate said ends, for pivotal movement, a tool carried towards one end of the elongate tool holder for machining the workpiece, an electric actuator having an actuator coil and a movable output member connected to the other end of the elongate tool holder, and a control system for supplying to the actuator coil, signals corresponding to a required workpiece profile, operation of the actuator moving the movable output member to pivot the tool holder to cause the tool to machine the workpiece to said profile.

According to a second aspect of the invention, there is provided a machine tool comprising a workpiece holder for holding and rotating a workpiece to be machined, an elongate tool holder having two ends and mounted intermediate said ends for pivotal movement about an axis normal to the length of said holder, said mounting including two spring strips which are connected between the tool holder and a mounting, which diverge towards the tool holder and which lie in respective planes intersecting at said pivot axis, a tool at one end of said tool holder for machining the workpiece and an actuator at the other end of the tool holder for pivoting the tool holder about said axis in accordance with control signals supplied thereto, to cause the tool to machine the workpiece to a required profile.

Figure 2:
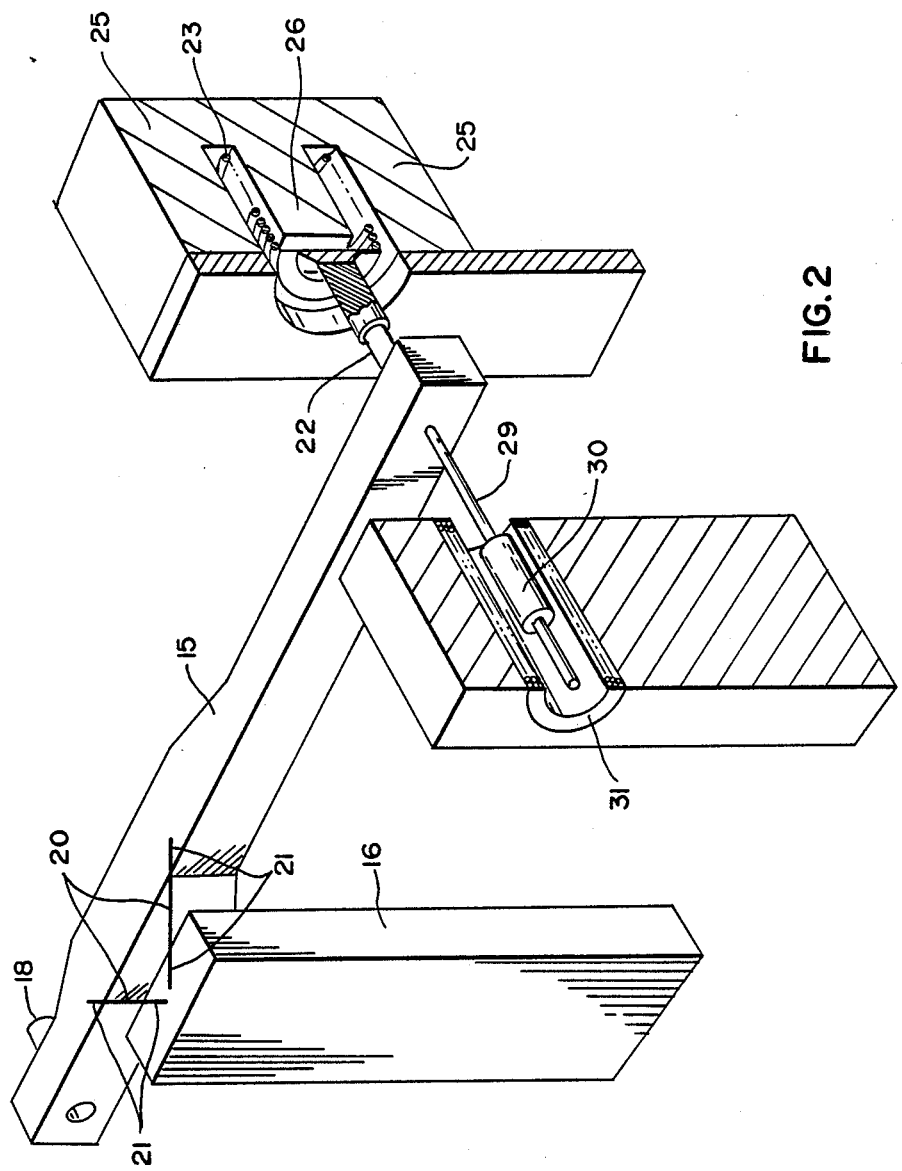

The following is a more detailed description of one embodiment of the invention, by way of example, reference being made to the accompanying drawings in which:

FIG. 1 is a schematic view of a machine tool incorporating an elongate tool holder pivotable about an axis by the actuator, and including a position transducer, and FIG. 2 is a view, to a larger scale than FIG. 1, of the tool holder actuator and position transducer of FIG. 1, the actuator and the position transducer being shown in section.

Referring first to FIG. 1, the machine tool comprises a workpiece holder 10 for holding and rotating a workpiece 11. This workpiece 11 may be, for example, a piston or a bearing whose surface is to have a complex profile, such as the profiles disclosed in our U.K. Patent Specification No. 2104188.

A carriage 12 is mounted for movement in a direction parallel to the axis of rotation of the workpiece 11 by a motor 13 acting through a lead screw 14. The carriage 12 carries a tool holder 15 connected to a mounting 16 and movable by an actuator 17. One end of the tool holder 15 carries a tool 18 and the other end of the tool holder is connected to a linear variable displacement position transducer 19.

These latter parts will now be described in more details with reference to FIG. 2.

The tool holder 15 is of low inertia and is formed by a straight bar of generally ractangular cross-section which may be of titanium or an aluminium alloy. The tool holder 15 is carried on the mounting 16 for pivotal movement about an axis normal to the length of the tool holder 15. This mounting is effected by two flat spring strips 20 which are connected between the tool holder 15 and the mounting 16, which diverge towards the tool holder 15 and which lie in respective planes intersecting said pivot axis. The spring strips 20 are received in respective slots 21 provided in the tool holder 15 and the mounting 16.

In the embodiment shown, these spring strips 20 are approximately one third the way along the tool holder from the tool 18. This provides a lever arm effect, which can be varied as required by altering the position of the spring strips along the tool holder 15.

The end of the tool holder 15 opposite the tool 18 carries a rod 22 which extends in a direction normal to the pivot axis of the tool holder 15 and normal to the length of the tool holder 15. The rod 22 is connected to, and forms a movable output member of, a movable coil 23 of the actuator 17 operating between the pole pieces 25, 26 of a magnetic core of the actuator 17.

A second rod 29 extends from the tool holder 15 in a direction which is the same as the direction of the rod 22. However, the second rod 29 is on the opposite side of the tool holder 15 to the rod 22. This second rod 29 carries a core 30 which is arranged within a coil 31 to from the position transducer 19.

With reference to FIG. 1, the coil 23 of the actuator 17 is connected to an amplifier 35 which receives a feedback signal from the position transducer 19. A control system 36 supplies control signals in digital form to a digital-to-analogue converter 37 whose analogue output is provided as a second input to the amplifier 35. The control system also supplies positioning signals to the motor 13 and is connected to the drive of the workpiece holder 10.

The control system 37 may be of any convenient kind which produces as an output a succession of signals defining required tool positions to machine a predetermined profile on the workpiece 11. For example, the control system could be the control system described in our co-pending U.K. Patent Application No. 85.18609 filed July 23, 1985. In this system, the workpiece holder 10 includes a stepping motor which receives a predetermined number of steps per revolution. Before machining, a computer within the control system works out the required tool positions to machine a workpiece profile, the computer storing a required tool position for each step of the workpiece stepping motor, starting from a datum. When machining commences, the workpiece motor is stepped, and after it passes the datum, the computer outputs a succession of workpiece motor stepping signals and a corresponding succession of tool position signals which are fed to the digital-to-analogue converter and the carriage motor 13 to effect required tool movement.

The way the signals are applied to the digital-to-analogue converter 37 are dealt with, as follows.

In the digital-to-analogue converter 37, each digital position signal is converted into an analogue signal.

This is applied as one input of the amplifier 35 together with a feedback signal from the position transducer 19. The corrected tool position signal so derived is fed to the actuator 17 to energise the coil 23. The magnetic field so induced in the coil 23 moves the rod 22 and causes the tool holder to pivot on the spring strips 20 about its pivotal axis. Thus, the tool 18 is moved to positions to machine the workpiece to the required profile.

The spring strips 20 provide a restoring force which tends to return the workpiece holder 15 to a datum position. This obviates the need for any restoring spring means in the actuator 17.

The movement of the tool holder 15 moves the core 30 of the position transducer 19, so providing the feedback signal to the amplifier 35.

It will be appreciated that actuators other than that shown in the drawings may be used. For example, a linear motor may be used, in which the core is moved relative to a stationary coil.

Although the spring strips 20 represent a particularly beneficial way of mounting the tool holder 15, because they are substantially free from frictional losses and back-lash, it will be appreciated that the tool holder may be mounted for pivotal movement in other ways than by spring strips 20.

The machine tool described above with reference to the drawings is a tool holder which is of low weight and inertia. The actuator and tool holder can respond quickly to positioning signals and this means that the tool can machine on the workpiece complex profiles at high speed; certainly at much higher speeds than conventional carriage and lead screw arrangements. The tool holder, its mounting and the actuator are of simple and comparatively inexpensive construction but are robust and reliable in operation.

I claim:
1. A machine tool comprising:
   a workpiece holder for holding a workpiece to be machined,
   means for rotating the workpiece,
   an elongate tool holder having two ends and two sides,
   a tool carried by the tool holder at one of said two ends,
   a mounting for the tool holder,
   two spring strips extending between the mounting and points on the tool holder intermediate said two ends, the spring strips lying in respective planes which intersect to define a pivot axis for the tool holder and diverging from the pivot axis to apply to the tool holder a restoring force urging the tool holder to a datum position,
   an actuator for moving the tool holder,
   an actuator coil and a movable output member included in the actuator and connected to one of said two sides at the other of said two ends of the tool holder,
   a position transducer connected to the other of said two sides at the other of said two ends for producing signals corresponding to the position of the tool holder, and
   a control system connected to the position transducer and the actuator for supplying to the actuator signals corresponding to a required workpiece profile, to cause the tool to machine the profile on the workpiece.

2. A machine tool according to claim 1 wherein the movable output member comprises a rod fixed at one end to the elongate tool holder and at an opposite end to the electric actuator.

3. A machine tool according to claim 2, wherein the rod is connected to the actuator coil, which is movable with the rod.

4. A machine tool according to claim 1 wherein the control system produces signals in digital form, a digital-to-analogue converter being provided for converting said digital signals to analogue signals, which are fed to the actuator.

5. A machine tool according to claim 1 wherein an amplifier is provided for amplifying the control system signals before said signals are applied to the actuator.

6. A machine tool according to claim 1, the position transducer comprises a linear variable displacement transducer having a core which extends from the tool holder in a direction which is the same as the direction of movement of the output member of the actuator but which core is on the opposite side of the tool holder.

* * * * *